United States Patent
Brachet et al.

(10) Patent No.: US 12,123,443 B2
(45) Date of Patent: Oct. 22, 2024

(54) FASTENER FOR THE TEMPORARY ASSEMBLY OF STRUCTURES

(71) Applicant: LISI AEROSPACE, Paris (FR)

(72) Inventors: Julien Brachet, Mehun sur yèvre (FR); Vincent Defrance, Preuilly (FR)

(73) Assignee: LISI AEROSPACE, Paris (FR)

( * ) Notice: Subject to any disclaimer, the term of this patent is extended or adjusted under 35 U.S.C. 154(b) by 251 days.

(21) Appl. No.: 17/858,088

(22) Filed: Jul. 6, 2022

(65) Prior Publication Data

US 2023/0021445 A1  Jan. 26, 2023

(30) Foreign Application Priority Data

Jul. 22, 2021 (FR) ..................................... 2107918

(51) Int. Cl.
*F16B 19/10* (2006.01)
*B25B 31/00* (2006.01)

(52) U.S. Cl.
CPC .......... *F16B 19/109* (2013.01); *B25B 31/005* (2013.01)

(58) Field of Classification Search
CPC .................................................... F16B 19/109
USPC ..................................................... 411/49–51
See application file for complete search history.

(56) References Cited

U.S. PATENT DOCUMENTS

| 4,416,048 A * | 11/1983 | Otte ....................... A47K 13/26 |
| | | 29/525.04 |
| 5,240,361 A * | 8/1993 | Armstrong ............ F16B 19/109 |
| | | 269/48.2 |
| 6,827,345 B2 * | 12/2004 | Anderson ................. B64F 5/10 |
| | | 269/49 |
| 7,300,042 B2 * | 11/2007 | McClure ............... F16B 19/109 |
| | | 279/143 |
| 8,075,234 B2 * | 12/2011 | McClure ............... F16B 37/043 |
| | | 411/55 |
| 9,709,085 B2 * | 7/2017 | McClure ............... F16B 19/109 |
| 9,970,468 B2 * | 5/2018 | McClure ............... F16B 19/109 |
| 10,190,615 B2 | 1/2019 | McClure |
| 10,260,548 B2 * | 4/2019 | McClure ............... F16B 33/002 |

(Continued)

FOREIGN PATENT DOCUMENTS

| EP | 2458232 | 12/2012 |
| EP | 3147520 A1 | 3/2017 |

OTHER PUBLICATIONS

Schandel, Yannick, Preliminary Report of Patentability, Mar. 25, 2022, 2 pages, Institute National de la Propriete Industrielle, France.

*Primary Examiner* — Flemming Saether
(74) *Attorney, Agent, or Firm* — Henricks Slavin LLP

(57) ABSTRACT

The invention relates to a fastener (10) for the temporary assembly of structures (12, 13), comprising: a tubular body, extending between a first end and a second end comprising at least two longitudinal tabs (46); a hooking element, rotationally prevented and capable of sliding axially in the body, said fastening element comprising a tubular base and a plurality of elastic clips (62) connected to one end of said base, each clip comprising a hooking spur (74); a driving device for the fastening element; and a spreader (26) fixed relative to the body, the plurality of elastic clips being positioned around said spreader. The tubular base (60) comprises two longitudinal grooves in an outer surface; and the fastener is configured so that each tab (46) of the body is capable of sliding axially in one of said grooves.

10 Claims, 3 Drawing Sheets

(56) References Cited

U.S. PATENT DOCUMENTS

| | | | |
|---|---|---|---|
| 10,920,812 B2 * | 2/2021 | Avetisian | F16B 5/0642 |
| 2016/0363146 A1 * | 12/2016 | Branyon, III | B23P 11/00 |
| 2021/0025424 A1 | 1/2021 | Brachet | |

* cited by examiner

FASTENER FOR THE TEMPORARY ASSEMBLY OF STRUCTURES

BACKGROUND

The present invention relates to a fastener for the temporary assembly of at least two structures comprising a bore, of the type which has: a tubular body, extending along a main axis, between a first end and a second end comprising at least two longitudinal tabs; a hooking element, which is rotationally fixed relative to the body and capable of sliding axially in the body; said hooking element comprising: a tubular base; and a plurality of elastic clips connected to one end of said base, each clip comprising a hooking spur; a device for driving the hooking element; and a spreader fixed relative to the body, the plurality of elastic clips being positioned around said spreader.

The invention relates specifically to temporary fasteners of the insertable clamp type.

In the aeronautical industry, before performing the final assembly of two structural elements, it is common practice to carry out a temporary assembly of the elements using temporary fasteners inserted into the through-holes. Temporary fasteners of this type are described in document EP3147520.

A temporary insertable clamp is able to join structures whose total thickness is within the clamping capacity range of said clamp, between a minimum and a maximum clamping capacity value, a deviation between said values depends on the specifications of said clamp.

SUMMARY

The purpose of the present invention is to optimize the dimensions of the existing fasteners. The advantage of using an insertable clamp is that it allows structures to be assembled within a wide range of total thickness, without the need to increase the length of the fastener body.

For this purpose, the invention comprises a fastener of the aforementioned type, wherein the tubular base includes: a substantially cylindrical outer surface; and at least two grooves formed longitudinally in said outer surface; and wherein the fastener is configured such that each tab of the body is capable of sliding axially in one of the grooves of the tubular base.

Other advantageous aspects of the invention are that the fastener comprises one or more of the following features, taken individually or according to all technically possible combinations:

- the hooking element comprises a longitudinal slot; and the fastener comprises a pin fixed to the body that passes through said slot, so as to rotationally fix the hooking element relative to the body;
- the spreader has a through hole through which the pin passes;
- the hooking element is connected to the driving device via a helical link so that the rotation of the driving device enables the hooking element to slide relative to the body;
- the hooking element comprises a threaded rod extending from the tubular base; and the driving device comprises a tapping capable of fitting into said threaded rod;
- the fastener is configured so that the tabs of the body are capable of sliding axially in the grooves of the hooking element and form a substantially continuous cylindrical surface with the outer surface of the tubular base;
- each tab of the body comprises two substantially planar first longitudinal edges; and each groove of the hooking element comprises: two second longitudinal edges, complementary in shape to the first longitudinal edges of a corresponding tab; and a bottom interposed between the two second longitudinal edges;
- the body comprises an enlarged head, said head comprising a bearing surface designed to bear against a first face of the structures;
- the enlarged head forms the first end of said body, the head comprising first mounting surfaces capable of being fitted to an installation tool to rotationally fix said body relative to the structures;
- one end of the driving device includes second mounting surfaces capable of being fitted to the installation tool to enable the rotation of said driving device relative to the body.

The invention also relates to an assembly comprising: structures to be assembled, comprising first and second opposing faces, and a bore opening to each of said first and second faces; and a fastener as described above, the plurality of elastic clips being positioned in the bore, the spreader being positioned between the hooking spurs of said clips, the bearing surface of the head and the hooking spurs coming into contact with the first face and the second face of the structures respectively.

BRIEF DESCRIPTION OF THE DRAWINGS

The invention will be better understood upon reading the following description, which is presented only as a non-limiting example, and with reference to the drawings, in which.

DETAILED DESCRIPTION

Figure 1:
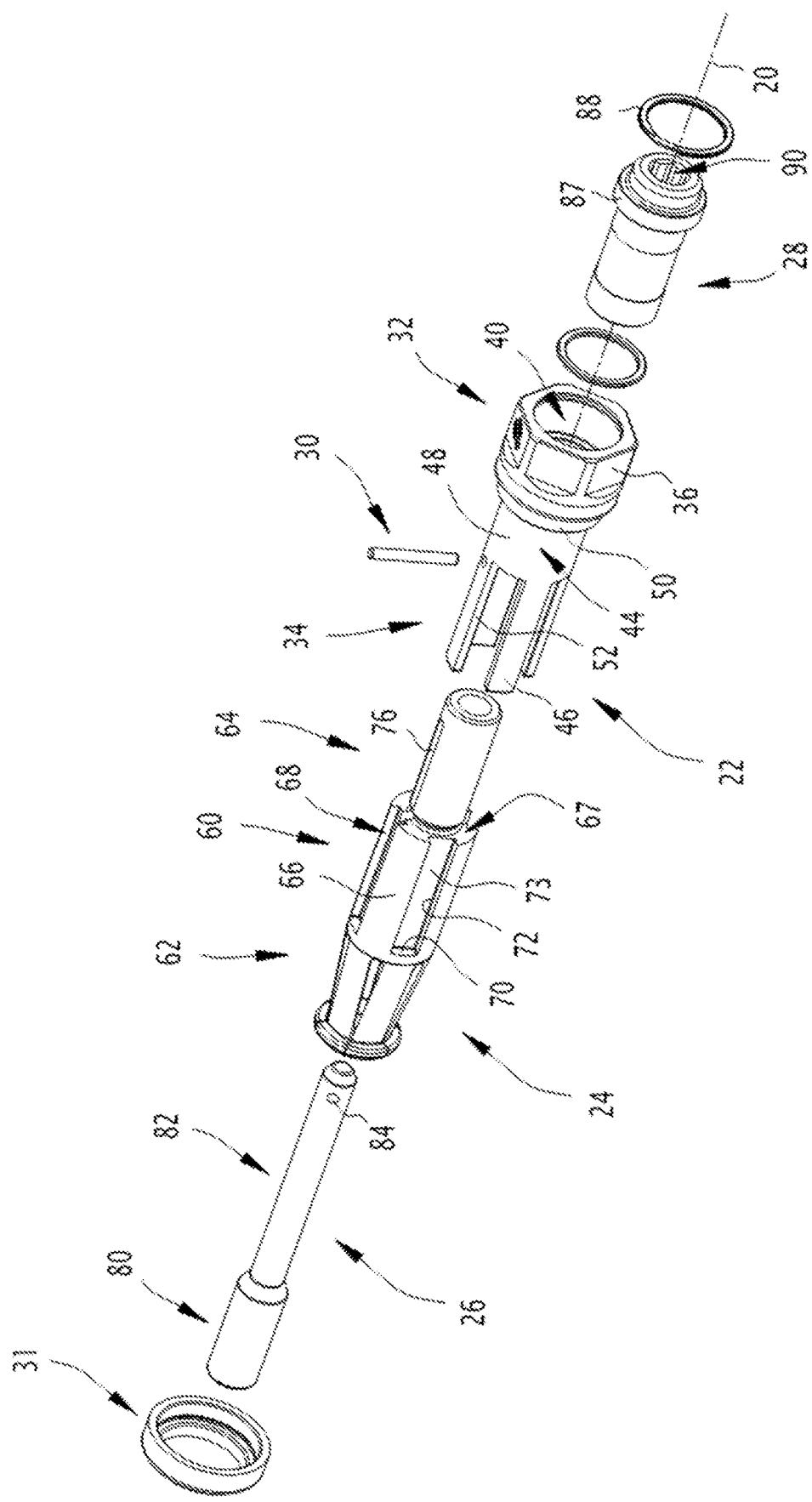
FIG. 1 is an exploded perspective view of a fastener according to one embodiment of the invention.
Figure 2:
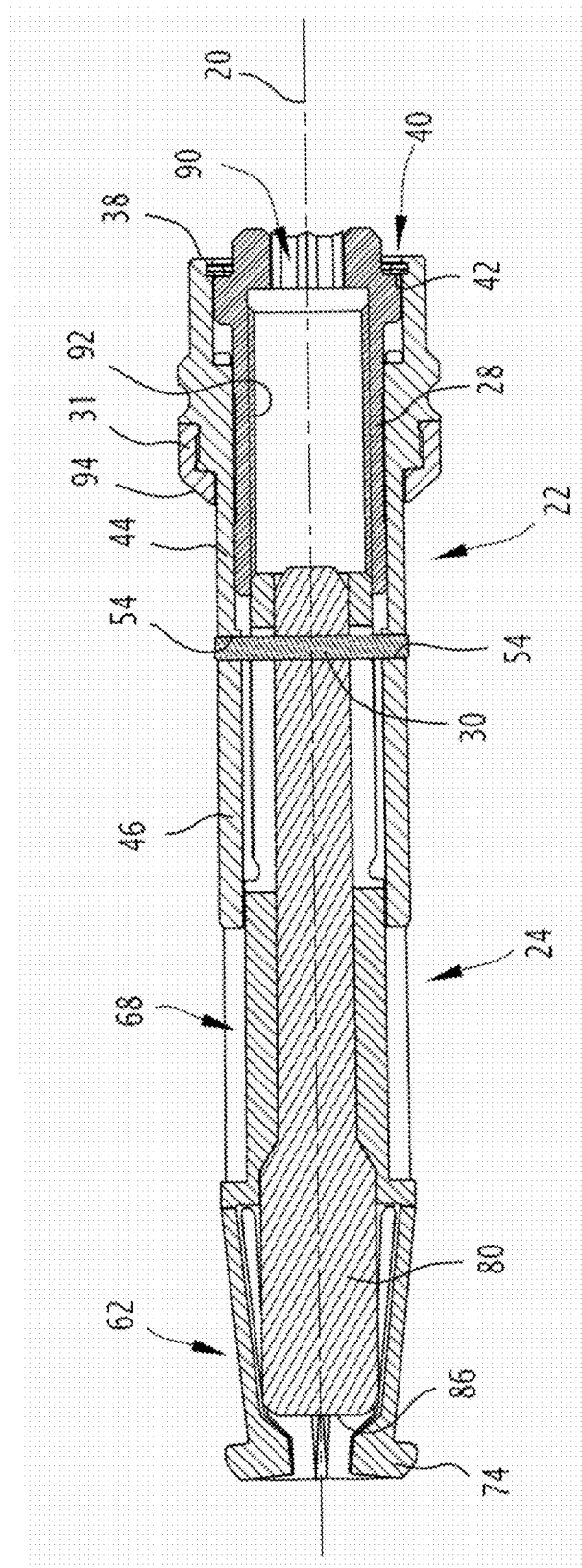
FIG. 2 is a cross-sectional view of the fastener in FIG. 1, in the first configuration.
Figure 3:
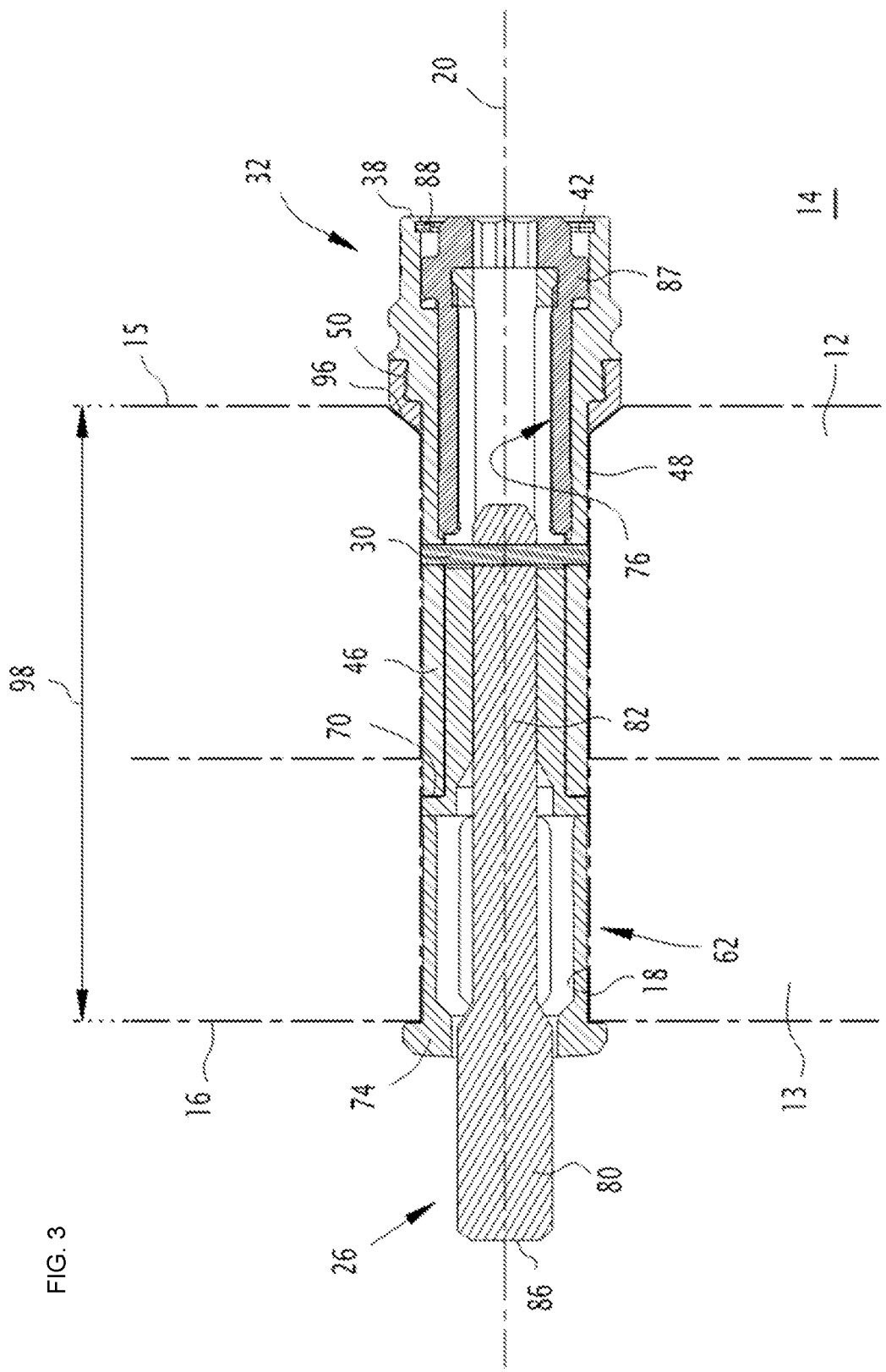
FIG. 3 is a cross-sectional view of an assembly comprising the fastener of FIGS. 1 and 2 in a second configuration.

FIGS. 1 to 3 represent a fastener 10 according to a first embodiment of the invention. Fastener 10 is suitable for temporary assembly on at least two structures 12, 13, shown in FIG. 3, to form an assembly 14. Structures 12, 13 define two opposing faces 15, 16. A bore 18 passes through structures 12, 13 from the first face 15 to the second face 16.

The fastener 10 extends along a main axis 20 and includes: a body 22; a hooking element 24; a spreader 26; a driving device 28; and a pin 30. In the embodiment shown, the fastener 10 also comprises an end-fitting 31.

The body 22 is substantially tubular in shape, and extends along the main axis between two open ends. The body 22 has an enlarged head 32 and a tubular shaft 34.

The head 32 includes first mounting surfaces 36 capable of being fitted to an installation tool (not shown) of the fastener 10, to rotationally fix the head 32 relative to the structures 12, 13. In the embodiment shown, the first mounting surfaces form flats 36 that are parallel to the main axis. For example, the first mounting surfaces form six-sided flats 36.

The head 32 also comprises a front wall 38 in which a front opening 40 forming a first open end of the body 22 is provided. Near said front opening, an inner surface of the head has an annular groove 42.

The front opening 40 opens onto an inner surface of the body 22, said surface being substantially circular in cross section.

The shaft 34 has a cylindrical portion 44 and a plurality of tabs 46.

The cylindrical portion 44 is adjacent to the enlarged head 32 and has a first smooth outer surface 48, whose diameter is conveniently equal to that of the bore 18 of the structures 12, 13, with a clearance allowing the fastener 10 to be inserted without force into the bore 18. In the embodiment shown, the cylindrical portion 44 also includes threading 50 over a short axial length at the joining point with the enlarged head 32.

In an embodiment that is not shown, the shaft 34 does not have a cylindrical portion 44: the tabs 46 are directly mounted to the head 32. In this embodiment, the end-fitting 31 is omitted. A ring may be optionally added, which is tightly fitted to the end of the tabs adjacent to the head, for example to enable the diameter of the fastener to be identified by a color code.

The plurality of tabs 46 extends axially from the cylindrical portion 44, an outer surface of said tabs fitting in a continuous cylinder with the first outer surface 48 of said cylindrical portion. The tabs 46 form openings extending longitudinally between one another.

The tabs 46 are preferably similar in shape and are evenly spaced at an angle around the main axis 20. The tabs 46 are at least two in number. In the embodiment shown, the shaft 34 has four tabs 46.

Each tab 46 has two longitudinal edges 52. Each of the edges 52 forms a planar surface substantially parallel to the main axis 20. In the embodiment shown, the edges 52 of a single tab 46 are substantially parallel to each other.

In the embodiment shown, two of the tabs 46, located opposite each other relative to the main axis 20, each have an orifice 54 generated with a closed loop and with a rounded contour. The two orifices 54 are aligned perpendicular to the main axis 20.

The hooking element 24 has a substantially tubular shape, extending along the main axis 20, and includes: a tubular base 60; a plurality of elastic clips 62; and a threaded rod 64.

The tubular base 60 includes a second outer surface 66, which is substantially rotationally cylindrical, with a diameter substantially equal to the diameter of the first outer surface 48.

The tubular base 60 further includes a crown-shaped end wall 67, substantially perpendicular to the main axis 20.

The base 60 further includes a plurality of grooves 68 formed longitudinally in the second outer surface 66. The grooves 68 extend between a first open end, opening onto the end wall 67, and a second closed end 70.

The number of grooves 68 is equal to the number of tabs 46 on the shaft 34. The grooves 68 are preferably similar in shape and are evenly spaced at an angle around the main axis 20.

Each groove 68 has two longitudinal edges 72, complementary in shape to the longitudinal edges 52 of a corresponding tab 46. Each groove 68 also has a flat bottom 73, interposed between the two longitudinal edges 72.

Each tab 46 of the body 22 is capable of sliding axially in a groove 68. Specifically, in a first configuration of the fastener 10 (FIG. 2), one end of each tab 46 is positioned in one of the grooves 68, near the first open end of said groove. In a second configuration of the fastener 10 (FIG. 3), said end of each tab 46 abuts the second closed end 70 of said groove. The tabs 46 then form a continuous cylindrical surface with the second outer surface 66 of the tubular base 60.

The elastic clips 62 extend axially from the base 60 on the side of the second closed end 70 of the grooves 68. The clips 62 are substantially identical, at least two in number, and preferably at least three or four in number for a more efficient distribution of the clamping force on the second face 16 of the structures 12, 13. In the embodiment shown, there are six elastic clips 62.

A first end of each elastic clip 62 includes a hooking spur 74, which is designed to come into contact with the second face 16 of structures 12, 13.

The clips 62 have an elastic quality. Specifically, said clips 62 are radially movable relative to the main axis 20 between a retracted position (FIG. 2), in which the hooking spurs 74 are in contact with each other, and an extended position (FIG. 3), in which said hooking spurs 74 are spaced laterally from each other.

The retracted position corresponds to a configuration of the clips 62 at rest, without external constraint. In the retracted position, the hooking spurs 74 in contact with each other substantially form a ring with an outer diameter that is less than or equal to the diameter of the bore 18 of the structures 12, 13. In the deployed position, the hooking spurs 74 substantially form an annulus with an outer diameter that is greater than the diameter of the bore 18 of the structures 12, 13.

The threaded rod 64 extends axially from the end wall 67 of the base 60, opposite the elastic clips 62.

The threaded rod 64 has a through slot 76 extending longitudinally between two closed ends. The longitudinal slot 76 conveniently extends in a flat plane that contains the main axis 20.

The spreader 26 has a first 80 and second 82 adjacent portions along the main axis 20. Each of the first and second portions has a cylindrical shape, that is preferably rotationally cylindrical. Preferably, the diameter of the first portion 80 is greater than the diameter of the second portion 82.

The second portion 82 of the spreader 26 is received in the body 22 and is fixed relative to said body. Specifically, one end of the second portion 82, opposite the first portion 80, has a through hole 84 perpendicular to the main axis 20. The pin 30 is housed in said through hole 84 as well as in the orifice 54 of the shaft 34, connecting the body 22 and the spreader 26.

In addition, the second portion 82 of the spreader 26 is received in the hooking element 24. Specifically, the pin 30 also passes through the longitudinal slot 76 formed in the threaded rod 64 of said hooking element.

The first portion 80 of the spreader 26 is also positioned within the hooking element 24. Specifically, in the first configuration of the fastener 10 (FIG. 2), an end 86 of the first portion 80, opposite the second portion 82, is received between the elastic clips 62. In said first configuration, the end 86 is axially remote from the hooking spurs 74. The clips 62 are thus in a retracted position.

In the second configuration of the fastener 10 (FIG. 3), the end 86 of the spreader forms an axial protrusion relative to the clips 62 or is received between the hooking spurs 74. Said clips 62 are then in the deployed position, with the hooking spurs 74 laterally spaced apart from each other by the first portion 80 of the spreader 26.

The driving device 28, also referred to in the description as a "tie nut", extends along the main axis 20 and is designed to rotate within the body 22. In the embodiment shown, the tie nut 28 includes an enlarged portion 87, translationally fixed inside the head 32 by means of a snap ring 88 housed in the annular groove 42.

One end of the tie nut 28, positioned at the front opening 40 of the body 22, comprises second mounting surfaces 90. Said second surfaces are capable of being fitted to the aforementioned installation tool, for rotating the tie nut 28 relative to the body 22.

In the embodiment shown, the second mounting surfaces are constituted by a recess 90 in the end of the tie nut 28. The recess 90 is for example cylindrical in shape with a hexagonal or bi-hexagonal base. Alternatively, the recess 90 may be a multi-lobed recess, as detailed in EP2458232 by the Applicant.

The tie nut 28 forms a helical link with the hooking element 24, the rotation of the tie nut thus enables said hooking element to slide axially relative to the body 22. In the embodiment shown, the tie nut 28 is tubular with two open ends, and has a tapping 92 adjacent to the recess 90. The tapping 92 is capable of fitting into the threading of the rod 64 of the hooking element 24.

The end-fitting 31 can be assembled to the body 22, by screwing on the threading 50 or by various other methods such as clipping, crimping, gluing, etc.

An outer surface 94 of the end-fitting forms a milled surface, which is capable of fitting into a countersink 96 of one of the structures 12 to be assembled. In an alternative embodiment, not shown, the outer surface 94 of the end-fitting forms a planar support for bearing on a planar surface of the structure 12, so as to form a protruding head.

A method for installing the fastener 10 into the structures 12, 13 to form an assembly 14 will now be described.

At the beginning of the installation process, the fastener 10 corresponds to the first configuration shown in FIG. 2. If required, said fastener can also be assembled to a robot (not shown) equipped with an assembly tool. Alternatively, the process described below is performed manually.

The fastener 10 is positioned opposite the bore 18 of the structures 12, 13, on the side of the first face 15. The fastener 10 is then inserted into said bore 18 until the head 32 abuts said first face 15. In the embodiment shown, the outer surface 94 of the end-fitting 31 fits into the countersink 96 of the structure 12.

The hooking spurs 74 of the clips 62, as well as the end 86 of the spreader 26, then form an axial protrusion relative to the second face 16.

An axial force is then applied to the head 32 so as to press it against the structure 12, while being rotationally fixed by an action on the flats 36, preferably by means of the assembly tool.

At the same time, the tie nut 28 is rotated relative to the head 32, by applying a torque to said tie nut through the recess 90.

The tapping 92 of the tie nut then engages the threading of the rod 64. Said rod thus moves towards the head 32, driving the entire hooking element 24.

The hooking element 24 moves axially in said body towards the head 32. The rotational prevention of the hooking element 24 relative to the body 22 can be carried out by two load-bearing mechanisms: a first mechanism is the pin 30 housed in the longitudinal slot 76, a second mechanism is the contact between the longitudinal edges 52 of the tabs against the longitudinal edges 72 of the grooves. The torque forces are distributed between the two load-bearing mechanisms according to the dimensions of the elements and the clearances provided for at the time of design and/or induced during manufacture, of the pin 30, the longitudinal slot 76, the tabs 46 and the grooves 68.

During movement of the hooking element 24 relative to the body 22, each longitudinal edge 72 of a groove 68 slides against a longitudinal edge 52 of a corresponding tab 46. Similarly, the bottom 73 of each groove 68 slides against an inner surface of the corresponding tab 46. The tabs 46 of the body and the second outer surface 66 of the tubular base 60 are in direct contact with the wall of the bore 18, close to the clearance to enable the hooking element 24 to slide relative to the body 22.

Due to the displacement of the hooking element 24 relative to the body 22, the hooking spurs 74 of the clips 62 are positioned axially opposite the end 86 of the spreader 26. The clips 62 move radially and laterally away from each other to the deployed position in FIG. 3, so as to form a circle with a diameter greater than the diameter of the bore 18. The hooking spurs 74 then project radially from the bore 18.

The rotation of the tie nut 28 is continued until the said hooking spurs 74 are in axial bearing against the second face 16 of the structure 13, around the bore 18. The tightening of the tie nut 28 and the rod 64 makes it possible to apply compressive force which joins the structures 12, 13 to be assembled. The assembly 14 of FIG. 3 is thus obtained.

Structures 12, 13 in FIG. 3 have a total thickness 98 which is close to the minimum thickness that the fastener 10 can assemble. The fastener 10 installed in the assembly 14 has a configuration in which the rod 64 is fully received in the tapping portion 92 of the tie nut 28 and/or in which the end of the tabs 46 abut the second closed end 70 of the grooves 68.

With structures having otherwise a maximum assembly thickness, the installed fastener 10 has a configuration in which the end 86 of the spreader 26 is substantially coplanar with the hooking lugs 74.

The fastener 10 described above allows for a large clamping range between the minimum and maximum thickness 98 of the structures 12, 13 to be assembled. The sliding hooking element 24 with the same diameter as the body 22 provides a fastener 10 of variable length.

In addition, the mounting surfaces 36 and 90 are compatible with many commercially available mounting tools.

The fastener 10 also has an advantage over the fastener described in the previously cited document EP3147520, that uses a rotating spreader, which has the disadvantage of twisting the ends of the hooking spurs, and prematurely wearing out the clips.

The invention claimed is:

1. A fastener for the temporary assembly of at least first and second structures together defining a bore, said fastener comprising:
   a tubular body extending along a main axis between a first end and a second end and including an enlarged head, with bearing surface configured to bear against a face of the first structure, that defines the first end and at least two longitudinal tabs that extend to the second end;
   a hooking element, which is rotationally fixed relative to the body and capable of sliding axially in the body; said hooking element comprising: a tubular base; and a plurality of elastic clips connected to one end of said base, each clip comprising a hooking spur configured to bear against a face of the second structure;
   a driving device for the hooking element; and
   a spreader fixed relative to the body, the plurality of elastic clips being positioned around said spreader;

said fastener being characterized as such that:
the tubular base includes: a substantially cylindrical outer surface; and at least two grooves formed longitudinally in said outer surface; and
the fastener is configured so that each tab of the body is capable of sliding axially in a respective groove of the tubular base.

2. A fastener as described in claim 1, wherein: the hooking element comprises a longitudinal slot; and the fastener comprises a pin fixed to the body that passes through said slot, so as to rotationally fix the hooking element relative to the body.

3. The fastener as described in claim 2, wherein the spreader has a through hole through which the pin passes.

4. A fastener as described in claim 1, wherein the hooking element is connected to the driving device via a helical link so that the rotation of the driving device enables the hooking element to slide relative to the body.

5. The fastener as described in claim 4, wherein the hooking element comprises a threaded rod extending from the tubular base; and the driving device comprises a tapping configured to cooperate with said threaded rod.

6. The fastener as described in claim 1, wherein the enlarged head includes first mounting surfaces capable of being fitted to an installation tool to rotationally fix said body relative to the structures.

7. The fastener as described in claim 1, wherein one end of the driving device includes second mounting surfaces capable of being fitted to the installation tool to enable the rotation of said driving device relative to the body.

8. An assembly comprising: structures to be assembled, comprising first and second opposing faces, and a bore opening to each of said first and second faces; and a fastener as described in claim 6, the plurality of elastic clips being positioned in the bore, the spreader being positioned between the hooking spurs of said clips, the bearing surface of the head and the hooking spurs coming into contact with the first face and the second face of the structures, respectively.

9. A fastener for the temporary assembly of at least two structures comprising a bore, said fastener comprising:
a tubular body, extending along a main axis, between a first end and a second end comprising at least two longitudinal tabs;
a hooking element, which is rotationally fixed relative to the body and capable of sliding axially in the body; said hooking element comprising: a tubular base; and a plurality of elastic clips connected to one end of said base, each clip comprising a hooking spur;
a driving device for the hooking element; and
a spreader fixed relative to the body, the plurality of elastic clips being positioned around said spreader;
said fastener being characterized as such that:
the tubular base includes: a substantially cylindrical outer surface; and at least two grooves formed longitudinally in said outer surface;
the fastener is configured so that each tab of the body is capable of sliding axially in a respective groove of the tubular base; and
the tabs of the body are capable of sliding axially in the grooves of the hooking element and form a substantially continuous cylindrical surface with the outer surface of the tubular base.

10. A fastener for the temporary assembly of at least two structures comprising a bore, said fastener comprising:
a tubular body, extending along a main axis, between a first end and a second end comprising at least two longitudinal tabs;
a hooking element, which is rotationally fixed relative to the body and capable of sliding axially in the body; said hooking element comprising: a tubular base; and a plurality of elastic clips connected to one end of said base, each clip comprising a hooking spur;
a driving device for the hooking element; and
a spreader fixed relative to the body, the plurality of elastic clips being positioned around said spreader;
said fastener being characterized as such that:
the tubular base includes: a substantially cylindrical outer surface; and at least two grooves formed longitudinally in said outer surface; and
the fastener is configured so that each tab of the body is capable of sliding axially in a respective groove of the tubular base;
wherein each tab of the body comprises two substantially planar first longitudinal edges; and each groove of the hooking element comprises: two second longitudinal edges, complementary in shape to the first longitudinal edges of a corresponding tab; and a bottom interposed between the two second longitudinal edges.

* * * * *